March 16, 1965  M. J. FINKELSTEIN  3,174,093
REGULATED POWER SUPPLY SYSTEMS
Filed Jan. 11, 1961  2 Sheets-Sheet 1
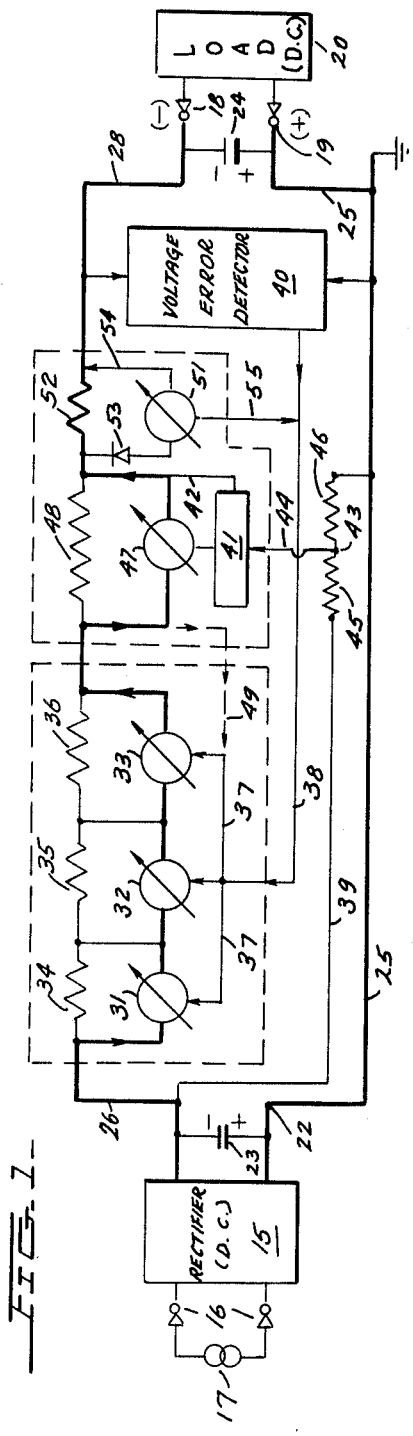
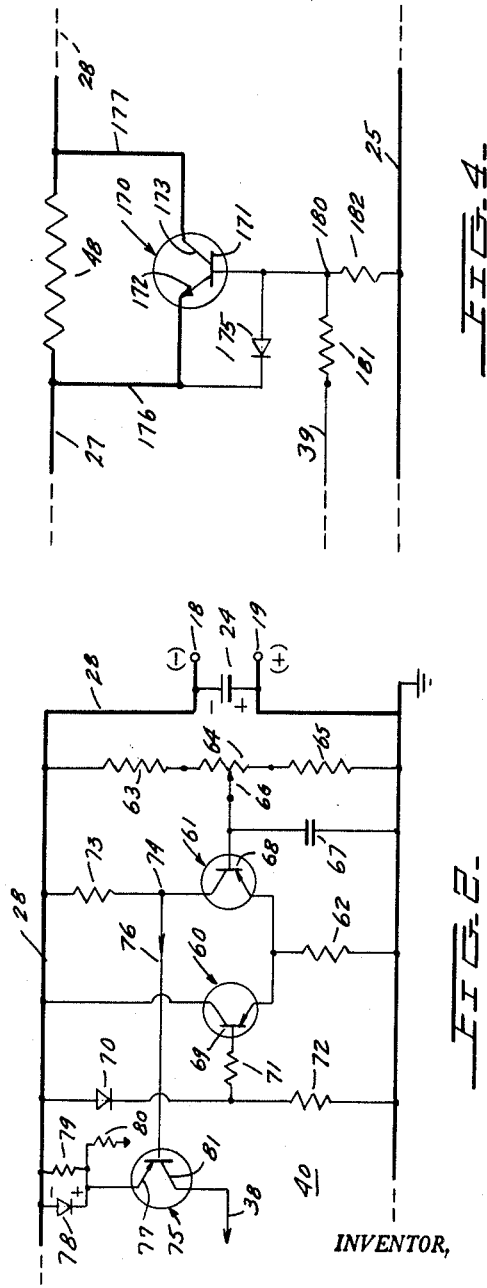
INVENTOR,
MARTIN J. FINKELSTEIN

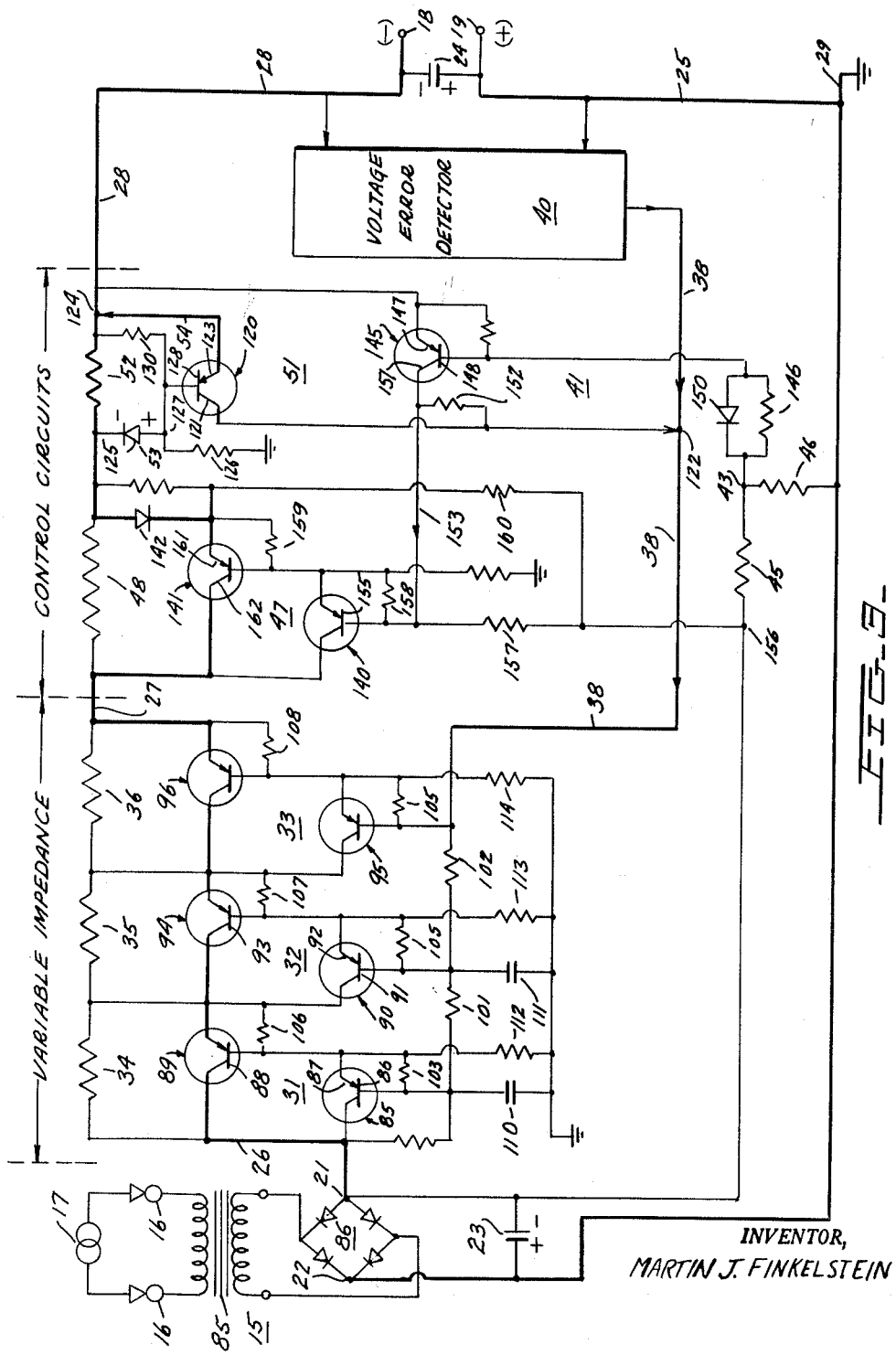

United States Patent Office 3,174,093
Patented Mar. 16, 1965

3,174,093
REGULATED POWER SUPPLY SYSTEMS
Martin J. Finkelstein, 150 Riverside Drive,
New York, N.Y.
Filed Jan. 11, 1961, Ser. No. 82,099
4 Claims. (Cl. 323—9)

This invention relates to regulated power supplies, and more particularly relates to novel power supply systems that cannot be damaged by sustained overloads or short-circuits.

The invention is particularly useful in hermetically sealed power supplies, where damage by short-circuitry or overloading makes repair impractical. Further, the circuit protection afforded by the present invention is particularly adapted to transistorized regulated power supplies. Cascaded transistor-resistor voltage control sections provide a variable impedance section in series between the initial rectified voltage and the load.

Upon substantial overload or short-circuit at the output or load side, the control circuitry hereof automatically and promptly limits the output current to say 125% of maximum rating, and simultaneously acts to alter the control bias on the variable impedance section to protect its transistors from damage. It has heretofore been impractical to effect the transition from normal load to short-circuit condition sufficiently rapidly to prevent overloading and burning-out of the transistors. The present invention overcomes this important problem, in an effective and relatively inexpensive manner.

It is accordingly a primary object of the present invention to provide novel power supply systems that is safe from overload or short-circuiting.

Another object of the present invention is to provide novel power supply systems incorporating a cascaded transistor-resistor section to regulate the output voltage, and control circuitry that prevents the transistors from damage under extreme load conditions.

A further object of the present invention is to provide novel power supply systems that may be hermetically sealed and not damageable from sustained overload or short-circuit operation.

Still another object of the present invention is to provide novel power supply systems useful aboard an aircraft, operable from a 400 cycle source, that is rugged, light in weight and safe from electrical damage.

These and other objects of this invention will become more apparent from the following description of an exemplary embodiment thereof, illustrated in the drawings, in which:

FIG. 1 is a block diagram of the invention power supply system.

FIG. 2 is an electrical diagram of one section of the system of FIG. 1.

FIG. 3 is a schematic circuit diagram of an exemplary power supply system.

FIG. 4 is a circuit diagram of a modified portion of the system of FIG. 3.

Referring to FIG. 1, D.C. rectifier 15 has two input terminals 16, 16 for connection to a source of alternating current 17. For aircraft applications, the source would typically be rated at 400 cycles and 115 volts. Other applications and system parameters are of course useable with the invention principles hereof. The power supply system output terminals 18, 19 connect to a load, indicated at 20. The load is of the D.C. variety; and a typical transistorized system hereof has a rated D.C. output at terminals 18, 19 of 120 volts at 0.2 ampere.

The exemplary rectifier 15 delivers approximately 160 volts D.C. at its immediate output terminals 21, 22. An electrolytic condenser 23 is across this output, in proper bias relation; with its negative side at terminal 21, and its positive at 22. The positive line 25 is held at system ground potential (at 29), and the system negative potentials, as terminals 18 and 21, are correspondingly at voltages below the grounded line 25. The reverse may be used, as is well known in the art. An output electrolytic condenser 24, across terminals 18, 19 is used, to further smooth possible line ripples.

The power supply system includes a variable impedance section 30 in series with the system negative lines 26, 27, 28. The variable impedance section 30 is composed of a series of controlled electronic units schematically indicated at 31, 32, 33. The exemplary units 31, 32, 33 are transistor pairs that pass variable currents under the control of system suitable signals to be described in detail hereinafter. The three current control units 31, 32, 33 are individually shunted by identical resistors 34, 35, 36 wires in series, in system line section 26–27. The equal resistors 34, 35, 36 serve to maintain uniform action and current division among the cascade current control units 31, 32, 33.

Passage of variable current across the transistor series paths 31, 32, 33 is the equivalent of their being variable resistances in the supply line 26–27. Control of the current thru units 31, 32, 33 is effected through their control input line 37, in connection with the control signal line 38. The effective resistance presented by the series current units 31, 32, 33 is substantially linear with control signal, in practice. A voltage error detector section 40, in circuit across output lines 25, 28 provides correcting control signals to control line 38. An exemplary circuit for such error control unit (40) is described in connection with FIG. 2 hereinafter.

The control circuits 50 protect the variable impedance section 30 from damage due to faulty load conditions. A comparator network 41 establishes when a substantial voltage drop occurs in the negative line, at the lead 42, with respect to a relatively fixed potential, as point 43 through lead 44. Potential point 43 is at a resistive voltage divider 45, 46 effectively across initial output terminals 21, 22, through lead 39 to terminal 21. Should the output line voltage, as at 18, 19 fall below a predetermined (safe) value, network 41 operates to bias current path control unit 47 to "open" and thereby effectively insert a relatively large ohmage resistor 48 in series with output line 27–28.

In normal operation, the system current passes through current "switch" unit 47, preferably of the transistor type as will be described in detail hereinafter in connection with FIGS. 3 and 4. When comparator network 41 operates to "open" switch unit 47 in response to an overload or line short-circuit, the resistor 48 immediately builds up a back-bias potential, e.g. 20 volts above that of terminal 18 when the load (20) is in short-circuit (to ground).

The back-bias potential across resistor 48 is directly communicated to current control units 31, 32, 33, schematically as indicated by bias link 49 thereto. Thus, upon overload or short-circuiting, the transistor control units 31, 32, 33 are promptly cut-off, without damage. The action is rapid and safe for all field operations encountered. The effective "open-circuiting" of transistor units 31, 32, 33 directly returns the series resistors 34, 35, 36 fully into the system line 26–27. The total effective resistance of resistors 34, 35, 36 and 48 in series limits possible external short-circuit currents to very low values, e.g. to below 0.03 ampere, fifteen percent of rating.

Another section of control circuit 50 is used to act rapidly to limit the peak current possible in the system line. This is accomplished by current limiter control unit 51 responsive to the drop across a small series resistor 52 in the system line. A reference diode 53 shown in the limiter circuit establishes a bias potential level, and when the drop across resistance 52 exceeds it, it activates unit 51. Unit 51 is preferably a transistor, which serves to bring the potential of signal line 38 to that of line 28 when so activated through links 54, 55.

Thus, a short circuit of line 28, causes a current rise through resistor 52 that quickly causes limiter 51 to conduct and bring control signal line 38 to the grounded line 28 condition. This action results in the transistor units 31, 32, 33 to lose their current gain, for protective purposes. A factor of 125% of rated current through line 27–28 would effectively short-circuit unit 51 for "grounding" line 38.

The prompt action of limiter 51 protects against gross current overloading, while that of back-bias unit 47 insures effective isolation of the transistor-variable impedance section 30 for the duration of the circuit fault. This prevents undue wear, overheating, and reduced life of the power system hereof that might result from external faults.

FIG. 2 is a diagram of a suitable transistorized voltage error detector section 40 for the power supply system of FIGS. 1 and 3. Transistors 60 and 61 are differentially connected, with their respective emitters having a common return impedance, resistor 62 to ground line 25. Sampling of the system output voltage, namely that across lines 25, 28 (and therefore terminals 18, 19) is obtained by the shunt network of resistors 63, 64, 65 in series. Tapped resistor 64 permits adjustment to the desired voltage level for the error control corresponding to the rated output. The base 68 of transistor 61 connects to the variable arm 66 of resistor 64. A bypass condenser 67 shunts arm 66 and the base to ground increasing sensitivity.

The base 69 of transistor 60 is held at a predetermined voltage level higher or more positive than that of the negative line 28. This is accomplished by means of a Zener diode 70, in series to the line 28. In the exemplary system, a 9 volt reference or differential was used thereat, with a base resistor 71 in circuit therewith. Resistor 72 is for ground return. Resistor 73 is the collector load, to line 28 for transistor 61. The collector of transistor 60 is directly connected to line 28, as shown, or may include a load.

The output voltage signal at point 74, at the emitter of transistor 61, is the result of voltage differences appearing at the respective bases 68, 69 of the two differential transistors. The signal at point 74 is conducted to an amplifier 75 through lead 76. The base of transistor amplifier 75 receives the differential signals from the 60, 61 pair. The emitter 77 of transistor 75 is maintained at a fixed potential difference above negative line 28 through a second Zener diode 78 circuit, including resistor 79, 80. A 7.5 volt positive value for emitter 75 has been found satisfactory in practice. The error detector-amplifier (40) signal output is from the collector 81 of transistor 75, to the error signal line 38.

FIG. 3 is a schematic circuit diagram of a complete exemplary power supply system, with the error detector 40 shown in block form, and corresponding (circuitwise to) that of FIG. 2. Like numerals are used in FIG. 3 for the same components and units described in the FIG. 1 system. The rectifier 15 conventionally employs a transformer 85 and a four-unit diode rectifier 86, supplying full-wave unidirectional energy to output terminals 21, 22 across electrolytic condenser 23. The stated D.C. voltage at terminals 21, 22 is 160 volts. The positive lead 25 is grounded at 29, while the system negative lead 26 has in it the series resistors 34, 35, 36, 48 and 52 already referred to.

The output terminals 18, 19 are rated at 120 volts D.C. and 0.2 ampere in the exemplary system. Other ratings are of course feasible. The current control transistor units 31, 32, 33 function as a variable impedance in negative line 26, 27, and automatically adjust the voltage drop to maintain rated voltage at terminals 18, 19 for any proper load (20) inserted. The drop across resistor 48 in normal operation is negligible, in view of the "switch" action of transistor unit 47; and the small drop across resistor 52 is readily accounted for in the overall design.

The variable current transistor pairs 31, 32, 33 compose the variable impedance section 30. These transistor pairs are connected in what is known in the art as the Darlington-type arrangement. Transistor pair 31 comprises drive transistor 85 control actuated at its base 86, and coupled from its emitter 87 to the base 88 of companion transistor 89. Similarly, a control signal from line 38 is impressed on the base 91 of drive transistor 90. Amplified current from transistor 90 is applied from its emitter 92 to the base 93 of driven transistor 94, forming the pair 32. Pair 33 likewise comprises drive transistor 95 coupled to driven transistor 96. Resistors 34, 35, 36 are of equal value, e.g. 3300 ohms, and have the function of dividing the voltage equally across the string of driven transistors 89, 94, 96.

Similarly, equal resistors 100, 101, 102 in series between control signal line 38 (with signal line 37) and the high negative terminal 21, correspondingly divide the control signals from error detector 40 among the drive transistor inputs. Resistors 101, 102, 103 were each 3300 ohms in the exemplary system. Each base is coupled to its associated emitter by a resistor proportioned to stabilize the respective transistor with respect to their operating characteristics due to ambient temperature change. In the exemplary system the drive transistor coupling resistors 103, 104, 105 are each 1200 ohms; those for the driven transistors 106, 107, 108, 100 ohms. Condensers 110, 111 by-pass unwanted frequencies. Grounded resistors 112, 113, 114 absorb leakage currents of their respective transistor pairs.

The cascaded transistor pairs 31, 32, 33 coact with their associated line resistors 34, 35, 36 to control the overall voltage drop of the section 30. The output (18, 19) voltage deviations or "error" from rated appear as corresponding signals in control line 38 from detector amplifier section 40. The "error" signals operate drive transistors 85, 90, 95, the amplified output currents of which respectively drive the transistors 89, 94, 96.

The output currents of the driven transistors 89, 94, 96 are the product of the currents applied to their bases and their respective current gains. Using like transistor pairs at 31, 32 and 33 provides a uniform flow of current between negative lines 26–27, including some through line resistors 34, 35, 36. The total current through lines 26–27 is variable, and in the system hereof controlled to effect a voltage drop thereacross whereby the voltage error detected by unit 40 at the output lines 35, 38 is substantially zero. Continuous system voltage regulation is thus afforded by sections 30 and 40, at the design value; 120 volts herein at terminals 18, 19. Practical voltage regulation of ±1% is achieved over a temperature range of −25° C. and +55° C., and over wide variations of line and load conditions.

The current limiter stage 51 in control section 50 is essentially a transistor 120 arranged to override the "error" signals fed to control line 38, as set forth hereinabove. The collector 121 is tied by lead 55 to point 122 of control line 38; and the emitter 123, to negative line 28 at point 124 through lead 54. Transistor 120 is normally non-conducting or "cut-off." It thus presents a relatively high impedance between points 122 and 124, with no effect on the control signals of line 38.

When the current through line resistor 52 exceeds a predetermined value, the limiter circuit (51) is arranged to directly render transistor 120 conducting. This condition has the effect of short-circuiting control line 38 to negative line 28 through leads 54, 55. During short-circuited load condition, line 28 is at effective ground potential, which is that of line 25 also. The control signals to the variable impedance section 30 are thereby effectively stopped; and the bias thus applied to drive transistors 85, 90, 95 promptly limits the maximum current through the transistors 89, 94, 96 and in the system. In practice, a maximum safety current limit of 125% of rating is readily attained; which, in the exemplary system, is 0.250 ampere at lines 25, 28.

The control of current limiter stage 120 is provided as follows: The sampling resistor, at 3 ohms, has a voltage drop of 0.6 volt at the rated 0.2 ampere; and 0.75 volt at the desired maximum of 0.250 ampere. A diode 125 connects between the negative line and ground through resistor 126, and normally develops a voltage difference of 0.6 volt to point 127, in the positive direction as indicated. The base 128 of transistor 120 connects to voltage point 127, and to the negative line (28) through resistor 130. With its emitter 123 at line 28 potential, the small positive potential of point 127 keeps transistor 120 in "cut-off" condition.

When the load current in line 28 rises above the normal rating, the drop across resistor 52 correspondingly rises, being 0.75 volt at 125% of rating. This drop appears across diode 125 and resistor 130, in series. The drop across the diode 125 cannot exceed the stated set 0.6 volt, and the excess voltage developed across resistor 52 activates the base-emitter (123, 128) junction of transistor 120. Transistor 120 is thus rendered conductive to effect the bias limiting function on control line 38 already described. The response is sensitive to overload conditions, and immune to below rated current operations; in practice being readily constructed to limit current to below 125% of rating under all encounterable field conditions.

It is important further, particularly when the whole power supply system is hermetically sealed to minimize the dissipation in the transistor pairs 31, 32, 33 beyond their normal design operation; and in fact bring their current flow to a low value as quickly as possible during short-circuit load conditions. This safety function is performed by control circuit section 50 in the following manner: During normal operation, line resistor 48 is effectively electrically shunted by the conduction states of both transistor 141 (of Darlington pair 47) and diode 142, in series.

Upon external load short-circuiting, the transistor 141 shunting action is opened, and a substantial potential drop promptly builds up across resistor 48. The fixed circuit connection of resistor 48 at line 27 to the transistor section 30 thereupon effects a "back-bias" that cuts off their conduction, in a manner detailed hereinafter. The system internal load presented to rectifier output 21, 22 in this fault state comprises resistors 34, 35, 36, 48 and 52, in series. In practice, this resistor chain limits the current of the exemplary system to less than 10% of rating under external short-circuit conditions.

The conduction states of transistor 141 and diode 142 are interrupted through the control of the D.C. amplifier 145 of the comparator section 41. The emitter 147 of transistor 145 connects to negative line 28 (at −120 volts), and its base 148 to the predetermined bias point 43 through resistor 146. In the exemplary circuit, with terminal 21 at approximately minus 160 volts, point 43 is at about −6 volts. Hence no base current flows in stage 145 during normal circuit operation, and transistor 145 remains in effect "cut-off."

However, during external short-circuit condition, the emitter 147 becomes grounded with line 28 connected thereto. The base 148 being at −6 volts is thus more negative than emitter 147, and current flows through diode 150, turning transistor 145 fully "on," into its conduction state. This abrupt mode switchover of transistor 145 upon the short-circuiting, serves as a control on the transistor pair 47, through collector 151 of amplifier 145, as will be described. The output load resistor 152 couples collector 151 to lead 55 and line 38. The comparator control from emitter 151 connects directly to the base 155 of transistor 140 through lead 153.

Under normal operating conditions the comparator amplifier stage 41, as stated, is "off," with no control effect on base 155 of stage 140, across lead 153. During this mode, the base 155 is at the high negative potential of point 156, namely that of terminal 21 at −160 volts, through coupling resistor 157. The Darlington-coupled transistor pair 140, 141 have stabilizing resistors 158, 159 between their respective bases and emitters. The series diode 142 is conductive, being connected to the higher negative point 156 through resistor 160. A steady drop of −.8 volt across diode 142 is used herein, serving as an effective "short-circuiting" element across resistor 48 when stage 141 is in conduction. The latter's emitter 161 is thus practically at the line 28 potential, at about −120 volts. The pair 140, 141 is thus in full conduction, with collector 162 completing the shunt circuit across resistor 48.

Thus, under normal system operation, resistor 48 is shunted by the low resistance conducting circuit of transistor 141 and diode 142. The exemplary resistor 48 is 1200 ohms, but is effectively out of the circuit in this mode. The line 27 is thereupon close to the potential of output line 28, namely at the rated output of −210 volts. As rectifier terminal 21 is about at −160 volts, the average drop through transistor impedance section 30 is 40 volts. This voltage range is divided among the three cascaded transistors 89, 94, 96; adjusting with variations in source (17) voltage and load (20) impedance, as will now be understood by those skilled in the art.

Upon external short circuit, line 28 becomes effectively grounded to the potential of line 25. This causes comparator amplifier 145 to immediately become fully conductive, as set forth hereinabove, as its base 148 is held at a more negative potential than is emitter 147 through point 43 (at −6 volts). This action causes collector 151 of stage 145 to go to approximately ground potential bringing base 155 of stage 140 to ground with it. However, emitter 161 of companion stage 141 is at −.8 volt with respect to ground due to the drop across diode 142. The combined biasing result is to effectively cut-off and "open" the electronic shunting action across resistor 48.

Accordingly, upon external short-circuit condition, the comparator circuit 41 promptly acts to remove the normal electronic shunting of line resistor 48. The full shorting current thereupon flows through the series resistor 48, which acts to directly drop it to a safer level. Further, the potential drop that concurrently develops across resistor 48 places line 27 at a substantial negative voltage with respect to ground and hence to line 25.

This action is in effect a back-bias on the emitter of the chain of transistors of section 30. Correspondingly, with limiter 51 effectively grounding control lead 38, the emitters of this transistor chain are thereupon more positive in potential than their corresponding emitters. For example, in the exemplary circuit, under external short-circuiting, the base of transistor 96 is at −19 volts; base 93, at −67 volts; and base 88, at −115 volts. Their corresponding emitters are at −20 volts, −68 volts, and −116 volts. With the emitters of impedance transistors 89, 94, 96 thus placed more negative than their bases, they are in cut-off and held "open" across resistors 34, 35, 36 for the duration of the external fault. The current through the lines 26, 27, 28 is thus safely held at a maximum of .030 ampere by the electronically "inserted" series resistors 34, 35, 36 and 48.

Upon removal of the external fault or short condition, the rated output voltage is promptly automatically restored to output terminals 18, 19. This is effected as follows: When a normal load (20) is returned to terminals 18, 19, a potential drop appears thereacross. The line 28 at terminal 18 thereupon becomes somewhat negative with respect to terminal 19, ground, and positive line 25. With emitter 147 of comparator amplifier 41 tied to line 28, its relative negative potential increases with respect to the fixed voltage of point 43 (−6 volts) to which base 148 is tied. The result is to cut-off the conduction of transistor 145, and eliminate its override action on transistor pair 47. The base 155 of transistor 140 is thereupon activated by its effective return to potential point 156, and the companion transistor 141 is again rendered conductive.

Resistor 48 is thereupon again effectively short-circuited, removing its back-bias action on the transistors of variable impedance section 30. In the meantime, the reduced current through lines 26, 27, 28 had lowered the potential drop across sampling resistor 52, which stopped the conducting state of transistor 125. The "error" signal control line 38 is therefore freed to exercise its normal impedance control action on section 30. The reshunting electronically of resistor 48 having removed the back-bias on section 30, its normal operative functioning is restored. The result is the originally described normal operation of all sections (30, 40 and 50) of the invention power supply system, at rated condition.

FIG. 4 is a circuit diagram of a modified form of the control circuit (50) for the power supply system hereof. The current limiter 51 thereof (FIG. 3) is retained, and not shown in FIG. 4. However, the comparator section 41 and the electronic shunt 47, composed of three transistors (140, 141, 145) and two diodes (142, 150), is replaced by one transistor (170) and one diode (175) in the FIG. 4 circuit. The transinstor 170 is of the NPN type as shown, and requires a relative positive voltage on its base 171 for its conduction mode. A relative negative voltage on base 171 renders transistor 170 cut-off.

The emitter 172 of transistor 170 connects to one side of resistor 48 through lead 176; and its collector 173, to the other side through lead 177. Transistor 170 is arranged to be conductive in normal system operation, electronically providing a low value shunt to resistor 48. The base 171 is connected to bias point 180 of voltage divider 181, 182 between negative line 39 and positive line 25. Point 180 is arranged to be at −80 volts in the exemplary circuit. With emitter 172 at a greater (−120 volts) negative value in this circuit than base 171, transistor 170 is thus normally maintained conductive. This condition results in the normal mode operation of the system as described for FIG. 3.

When an external short-circuit occurs, the emitter 172 is thereby brought close to ground potential. With its base 171 tending to go to the fixed potential of point 180 (−80 volts), the transistor 170 directly and fully cuts-off. This promptly removes its electronic shunting action on resistor 48, effectively placing it in the negative line 27, 28. This is precisely what the FIG. 3 circuit accomplishes upon system short-circuit. The result is to safely back-bias the transistor section 30 as hereinabove described.

The diode 175 is connected between base 171 and emitter 172. Its function is to prevent a voltage difference to occur beyond a predetermined amount between the base and emitter, e.g. 0.6 volt when the transistor 170 is in its cut-off condition. Thus when a system short-circuit occurs, the diode 175 holds base 171 at about the −0.6 volt with respect to the emitter 172, preventing the base-emitter voltage from being exceeded. Upon removal of the load fault, the normal biasing relations are resumed similar to that described for FIG. 3, and the normal functioning of the system prevails.

Although the present invention has been illustrated with exemplary versions thereof, it is to be understood that variations and modifications may be made by those skilled in the art without departing from the broader spirit and scope thereof as set forth in the following claims.

I claim:
1. A regulated power supply system comprising a source of rectified direct current, variable impedance means in series with one line of the system extending from the source including resistors and transistors in shunt with said resistors to control the net impedance presented by said variable impedance means, and control circuitry having a substantial resistance in series with said means, said control circuitry containing electronic means in shunt with said resistance and biased for substantially normally shunting out said resistance during system operation and fault-detection means for promptly back-biasing said transistors to avoid their unloading and to alter the bias on said electronic means to reestablish said resistance in series action upon a predetermined voltage fault in the system to curtail the system current output.

2. A regulated power supply system comprising a source of rectified direct current, variable impedance means in series with one line of the system extending from the source including resistors and transistors in shunt with said resistors to control the net impedance presented by said variable impedance means, voltage error detector means responsive to the system output voltage for providing a control signal in accordance with the output voltage deivation from a preset value, circuit means applying said control signal to operate said transistors for controlling said net impedance to maintain said preset output voltage, and control circuitry having a substantial resistance in series with said means, said control circuitry containing electronic means in shunt with said resistance and biased for substantially normally shunting out said resistance during system operation and fault-detection means for promptly back-biasing said transistors to avoid their unloading and to alter the bias on said electronic means to reestablish said resistance in series action upon a predetermined fault in the system to curtail the system current output.

3. A regulated power supply system as claimed in claim 1, in which the fault-detection means of said control circuitry includes a voltage comparator network to determine said system fault comprising a voltage divider connected across said source and trigger means responsive to said divider and the system line voltages for triggering said electronic means to effect the reestablishment of said resistance upon occurence of said fault.

4. A regulated power supply system as claimed in claim 2, in which the fault-detection means of said control circuitry includes a comparator network to determine said system fault comprising a divider connected across said source and trigger means responsive to said divider and the system line voltages for triggering said electronic means to effect the reestablishment of said resistance promptly upon occurence of said fault.

References Cited by the Examiner
UNITED STATES PATENTS

| | | | |
|---|---|---|---|
| 2,915,693 | 12/59 | Harrison. | |
| 2,981,884 | 4/61 | Tighe. | |
| 3,078,410 | 2/63 | Thomas | 323—22 |
| 3,101,441 | 8/63 | Curry | 323—22 |
| 3,101,442 | 8/63 | Darbie | 323—22 |

LLOYD McCOLLUM, *Primary Examiner.*

MILTON O. HIRSHFIELD, *Examiner.*